(12) United States Patent
McNair (10) Patent No.: US 10,944,687 B1
(45) Date of Patent: *Mar. 9, 2021

(54) SYSTEMS AND METHODS FOR OPTIMIZING USER-RESOURCE ALLOCATIONS TO SERVERS BASED ON ACCESS PATTERNS

(71) Applicant: CERNER INNOVATION, INC., Kansas City, KS (US)

(72) Inventor: Douglas S. McNair, Seattle, WA (US)

(73) Assignee: CERNER INNOVATION, INC., Kansas City, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/504,519

(22) Filed: Jul. 8, 2019

Related U.S. Application Data

(63) Continuation of application No. 15/395,999, filed on Dec. 30, 2016, now Pat. No. 10,348,637.

(60) Provisional application No. 62/272,986, filed on Dec. 30, 2015.

(51) Int. Cl.
| | | |
|---|---|---|
| *C12Q 1/6888* | (2018.01) | |
| *C12Q 1/04* | (2006.01) | |
| *H04L 29/08* | (2006.01) | |
| *H04L 12/911* | (2013.01) | |
| *H04L 12/24* | (2006.01) | |
| *G06F 8/30* | (2018.01) | |

(52) U.S. Cl.
CPC .......... *H04L 47/70* (2013.01); *H04L 41/5009* (2013.01); *H04L 67/10* (2013.01)

(58) Field of Classification Search
CPC ...... H04L 47/70; H04L 67/10; H04L 41/5009

USPC ........................................................ 709/226
See application file for complete search history.

(56) References Cited

U.S. PATENT DOCUMENTS 9,081,829 B2 * 7/2015 Bhave ................. G06F 16/2477
10,348,637 B1 7/2019 Leawood et al.
(Continued)

OTHER PUBLICATIONS

Notice of Allowance received for U.S. Appl. No. 15/395,999, dated Feb. 28, 2019, 10 pages.
(Continued)

*Primary Examiner* — David R Lazaro
*Assistant Examiner* — Berhanu Shitayewoldetadik
(74) *Attorney, Agent, or Firm* — Shook, Hardy & Bacon, L.L.P.

(57) ABSTRACT

Systems, methods, and computer-readable media are provided for facilitating system optimization through the use of user-resource allocations to servers based on determined access patterns. In one embodiment, recurrent patterns of access are identified based on combinations of computer system users and system-hosted resources. In some embodiments, groupings of user-resource combinations can be determined. The groupings are valuable for optimizing the allocation of users and/or resources to a plurality of servers, particularly under conditions of heavy simultaneous resource demand. Patterns may be determined from user-resource pair access time series, and groupings may be determined based on derived strength of association of these. Based on the groupings, users and resources may be allocated to servers efficiently. Allocation optimization can be an effective means for mitigating or preventing Service Level Agreement non-compliance.

20 Claims, 7 Drawing Sheets

(56) References Cited

U.S. PATENT DOCUMENTS

| | | | | |
|---|---|---|---|---|
| 2006/0148555 A1* | 7/2006 | Dent | G06Q 50/34 | 463/25 |
| 2006/0269476 A1* | 11/2006 | Kuo | A61B 6/032 | 424/1.11 |
| 2007/0220149 A1* | 9/2007 | Kawashima | H04L 67/1008 | 709/226 |
| 2008/0201468 A1* | 8/2008 | Titus | H04L 43/0829 | 709/224 |
| 2008/0307073 A1* | 12/2008 | Hachimura | H04L 67/2852 | 709/219 |
| 2009/0204975 A1* | 8/2009 | Hagiu | G06F 9/542 | 719/314 |
| 2010/0169490 A1* | 7/2010 | McNair | G06F 9/5083 | 709/226 |
| 2010/0218241 A1* | 8/2010 | Faryna | H04W 12/0608 | 726/5 |
| 2012/0096153 A1* | 4/2012 | Weiser | G06F 9/5011 | 709/224 |
| 2012/0102032 A1* | 4/2012 | Byrne | G06F 16/212 | 707/737 |
| 2013/0091284 A1* | 4/2013 | Rothschild | G06F 3/067 | 709/226 |
| 2013/0290525 A1* | 10/2013 | Fedor | H04L 41/147 | 709/224 |
| 2014/0067275 A1* | 3/2014 | Jing | G06K 9/6222 | 702/19 |
| 2014/0089511 A1* | 3/2014 | McLean | H04L 67/10 | 709/226 |
| 2015/0143367 A1* | 5/2015 | Jia | G06F 9/5016 | 718/1 |
| 2019/0230186 A1* | 7/2019 | Yellin | H04L 67/2847 | |

OTHER PUBLICATIONS

Pre Interview First Office Action received for U.S. Appl. No. 15/395,999, dated Sep. 4, 2018, 8 pages.

* cited by examiner

```
library(indicspecies)
library(plyr)
library(data.table)
library(ade4)
library(vegan)
library(gclus)
library(cluster)
library(RColorBrewer)

# load sparse array Users-Patients pairs data (8MB file)
# 11380 users, 52775 patients, 401061 rows (accesses) for user-patient pairs
upp <- read.csv(file="c:/0_cerdsm/IP/user_cluster_patient_10x/up_pairs.csv", header=TRUE,
        colClasses=rep("character",2))

# create de-duped sorted User and Patient dimensions
rn <- sort(upp$User[!duplicated(upp$User)])
rnl <- length(rn)
cn <- sort(upp$Patient[!duplicated(upp$Patient)])
cnl <- length(cn)

# tag each row as a single access
acc <- length(upp[,1])
upp$count <- rep(1,acc)

# sum accesses for each extant User-Patient pair
agg <- aggregate(count ~ User + Patient, data=upp, sum)

# init matrix to contain contingency table
upp.contin <- matrix(rep(0,rnl*cnl), ncol=cnl)
rownames(upp.contin) <- rn
colnames(upp.contin) <- cn calculate contingency table of counts by User-Patient pair
t1 <- Sys.time()
for (k in 1:acc) {
    i <- sapply(agg[k,1], function(y) grep(y,rn)[1])
    j <- sapply(agg[k,2], function(y) grep(y,cn)[1])
    upp.contin[i,j] <- agg[k,3]
}
t2 <- Sys.time()
t2-t1
```

⋮

CONTINUES IN FIG. 3B

FIG. 3A

CONTINUES FROM FIG. 3A

. . .

```
39 min check that contingency table has correct total count == acc
sum(upp.contin)

# checkpoint and save contingency table
# write.csv(upp.contin, file="c:/0_cerdsm/IP/user_cluster_patient_10x/uppcontin.csv")
#   1.2GB file
# upp.contin <- fread("c:/0_cerdsm/IP/user_cluster_patient_10x/uppcontin.csv", header=TRUE)
# setnames(upp.contin, colnames(upp.contin), cn)

# cast contingency table as species dataframe
upp.contin.df <- as.data.frame(upp.contin, row.names=TRUE, optional=FALSE,
        stringsAsFactors=default.stringsAsFactors())

# set minimum combination cardinality and maximum combination arity for cluster calculations
arity <- 1   # max 1-way (single user)
card <- 5    # min 5 occurrences to warrant designation as significant combo create User combinations
entire array attempts to allocate 21GB vector space in main memory
t1 <- Sys.time()
Y <- combinespecies(X=upp.contin.df[1:3000,1:1200], max.order=arity, min.occ=card, verbose=TRUE)
t2 <- Sys.time()
t2-t1
4 sec normalize to correct for asymmetry and sparsity (large number of cells with zero counts)
upp.contin.norm <- decostand(upp.contin.df[1:3000,1:1200], "normalize")

# explore optimal kmeans partitioning, 2 to 5 groups
t1 <- Sys.time()
upp.KM.cascade <- cascadeKM(upp.contin.norm, inf.gr=2, sup.gr=5, iter=50, criterion="ssi")
```

. . .

CONTINUES IN FIG. 3C

FIG. 3B

CONTINUES FROM FIG. 3B

.
.
.

```
t2 <- Sys.time()
t2-t1
31 min inspect the kmeans cascade results, 2 to 5 groups
upp.KM.cascade$partition[1:30,1:15])
windows(title="", 15, 10)
plot(spe.KM.cascade, sortg=TRUE)

# identify optimal number of groups by SSI criterion
# nbr.centers <- which.max(unlist(upp.KM.cascade$results)[2,]) + 1
nbr.centers <- 2 identify nbr.centers Patient clusters using kmeans operating on normalized array
entire array attempts to allocate 4.5GB
t1 <- Sys.time()
cl <- kmeans(upp.contin.norm[1:3000,1:1200], centers=nbr.centers, nstart=120)
t2 <- Sys.time()
t2-t1
34 sec, scales linearly in the number of nstarts and N*M in dim of upp.contin array plot the groups
plot(upp.contin[1:3000,1:1200], col=cl$cluster)
# points(cl$centers, col=1:2, pch=8, cex=2)

# calculate indicator value of User combinations for each of the 2 Patient groups
upp.strassoc.indval <- strassoc(Y$XC, cluster=cl$cluster, func="IndVal.g")

# calculate point biserial correlation value of User combinations for each of the 2 Patient groups
# upp.strassoc.biser <- strassoc(Y$XC, cluster=cl$cluster, func="r.g")

# calculate p-levels and best group-membership for Users whose prevalence is significantly
higher in one of the Patient groups
t1 <- Sys.time()
grp <- signassoc(upp.contin.df[1:3000,1:1200], cluster=cl$cluster, mode=1,
control=how(nperm=999))
```

.
.
.

CONTINUES IN FIG. 3D

FIG. 3C

CONTINUES FROM FIG. 3C
.
.
.

t2 <- Sys.time()
t2-t1
2.5 min display groupings
grp$best
grp1 <- which(grp$best==1)
head(grp1)
length(grp1) #  1191 pats
grp2 <- which(grp$best==2)
head(grp2)
length(grp2) #   9 pats if nbr.centers > 2, may merge smaller groups into single pool display Patients who are members of grp2     #  9 pats  (0.8% of 1200)
pats.grp2 <- cn[grp2]
"115839754" "115839832" "115841104" "115841176" "115847382" "115902051"
"115902271" "115919953" "115920666"

display Users who accessed members of grp2    # 47 users  (1.6% of 3000)
users.grp2 <- rn[which(upp.contin[,cn[grp2]] > 0)]
users.grp2 <- sort(users.grp2[!duplicated(users.grp2)])
"14921257" "16001280" "16712103" "17166750" "2262926" "2263009" "2273337"
"2287891" "2287909" "2288305" "2288490" "2307660" "2308103" "2308263"
"2458210" "2458360" "2458377" "2458744"
"2458884" "2475954" "2487606" "35042782" "36633376" "38837574" "40661670"
"43167872" "44663311" "44981648" "47934520" "49585443" "49631616" "54959877"
"55144022" "55881998" "55945145" "60353698"
"62759652" "66751560" "68261478" "68741143" "69611926" "69788411" "70372814"
"821156" "822353" "822665" "822679"

FIG. 3D

SYSTEMS AND METHODS FOR OPTIMIZING USER-RESOURCE ALLOCATIONS TO SERVERS BASED ON ACCESS PATTERNS

CROSS-REFERENCE TO RELATED APPLICATIONS

This application is a Continuation Application of U.S. Non Provisional application Ser. No. 15/395,999 titled "SYSTEM AND METHOD FOR OPTIMIZING USER-RESOURCE ALLOCATIONS TO SERVERS BASED ON ACCESS PATTERNS," filed Dec. 30, 2016, which claims the benefit of U.S. Provisional Application No. 62/272,986 titled "SYSTEM AND METHOD FOR OPTIMIZING USER-RESOURCE ALLOCATIONS TO SERVERS BASED ON ACCESS PATTERNS," filed Dec. 30, 2015. The aforementioned are hereby expressly incorporated by reference in its entirety.

INTRODUCTION

The rate of dataflow in computer networks between hosts and clients in remote-hosted (RHO) and ASP systems depends upon many parameters. Some of these parameters can be tied to the provision of telco, router, firewall, network, CPU, memory, disk, and other resources. These provisioned resources can be measured and system performance reports can be generated to determine whether the parameters are in compliance with a negotiated Service Level Agreement (SLA), or whether existing allocations present risks of near-term violation of the terms of the SLA. An SLA between a service provider and a client organization defines the expected and acceptable properties of the services, typically in the context of providing Internet-based application services that are hosted by the remote-hosting organization. The SLA sets forth the means and metrics whereby specified performance goals can be measured, by defining the performance metrics and the corresponding goals and level-of-service guarantees. By monitoring compliance with SLA limits, an RHO service provider can avoid the costly problems that result from disappointing users or hosted client organizations.

RHO operations can be monitored and measured using standard techniques such as Route Monitor (RMON) and IBM Websphere, Tivoli, or other available monitoring software. Furthermore, some network monitors monitor the number of concurrent network connections that can be opened on each server and the number of concurrent users who have sessions active at each point in time, logging such information to a monitoring database.

It is generally known that an SLA can be defined to guarantee the dataflow rates and system availability in remotely-hosted RHO systems. Resource capacity (bandwidth) is allocated or assigned to the flows by the managers of the systems so as best to satisfy the SLA parameters. SLA-based allocations are intended to guarantee the requested bandwidth from the client to the server and back.

It is further known by those skilled in the art that individual host computers can create logs of each client session, including each resource request and each moment of system resources' utilization. These machine-readable log files are stored on disk in the host computers. The log files contain 'raw,' unformatted information about each transaction or client request, and may be provided in diverse formats.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

Systems, methods, and computer-readable media are provided for reliable determination of clusters or groupings of users and resources such that an optimal load-balancing in a multi-Server system can be established and revised as-needed over time, under evolving conditions of usership, resource sets, servers, and Service Level Agreements (SLAs).

In one aspect a system and method for optimizing user-resource allocations to servers through clustering or grouping of users and/or resources and subsequently allocating those users and/or resources to a plurality of servers based on the clustering provided. This can be advantageous in a computing system under conditions of heavy simultaneous resource demand. In some aspects optimization is based on patterns determined from historical user-resource pair access time-series data. As such, optimizing user-resource allocations can be an effective means of mitigating or preventing 'Service Level Agreement' (SLA) non-compliance compared to prior art means of partitioning servers, users, and resources and allocating specific users and resources to particular Servers.

In one aspect, user-resource allocations are optimized by identifying recurrent access patterns of user-resource pairs, for example combinations of computer system users and system-hosted resources (e.g. EHR records of specific patients). Subsequently, user-resource combinations are used to determine clusters, or significant groupings, of those user-resource combinations. The statistical strength of association of the clusters, and/or their significance can be determined which in turn can drive allocation of users and resources to servers according to the clusters.

In one aspect a method is provided for optimizing user-resource allocations to one or more servers, comprising: acquiring a time-series of access measurements to a plurality of resources by a plurality of users on a plurality of servers, and storing said time-series; retrieving said time-series for generating user-resource clusters or groupings; de-duplicating and sorting the series by user and by resource; summing the accesses for each extant user-resource pair on each server; calculating and generating a contingency table, where cells in the table contain access counts by each user-patient pair; setting a minimum combination cardinality of accesses to be considered sufficient for purposes of frequent-access grouping determinations and maximum combination arity of user groupings for cluster calculations; creating user combinations; normalizing the contingency table to correct for contingency table asymmetry and sparsity; performing a cascade of repeated cluster determinations using clustering methods, to determine the optimal partitioning cluster number k to be sought; performing clustering via clustering methods, preferably such that numerical stability can be ascertained and statistical precision of group assignments can be improved; calculating indicator values of user combinations for each of the clusters; calculating statistical p-values and best group-membership for users whose prevalence of accesses is significantly higher in one of the resource clusters than in other clusters; and storing the group-membership bindings for users and resources thus determined for subsequent use in server-user-resource allocation in system management.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As one skilled in the art will appreciate, embodiments of our invention may be embodied as, among other things: a method, system, or set of instructions embodied on one or more computer readable media. Accordingly, the embodiments may take the form of a hardware embodiment, a software embodiment, or an embodiment combining software and hardware. In one embodiment, the invention takes the form of a computer-program product that includes computer-usable instructions embodied on one or more computer readable media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information, including computer-storage media and communications media. Examples of stored information include computer-useable instructions, data structures, program modules, and other data representations. Computer storage media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, other magnetic storage devices, and other computer hardware or storage devices. These technologies can store data momentarily, temporarily, or permanently.

Embodiments of the present invention are generally directed to systems and methods for optimizing load-balancing in a large systems hosting transaction-processing operations that involve highly frequent initiation and termination of user sessions, frequent binding and unbinding of users to individual resources (such as, for example, patient records in an electronic health record system (EHR)), and highly frequent updates and transactions executed by users upon the bound resources. In various aspects, user-resource allocations to servers can be optimized based on access patterns and cluster generation.

Other attempts or efforts at characterizing user-resource allocations have numerous limitations and are deficient due to: (1) the omission of basis characteristics that objectively quantify multivariate patterns of recurring utilization of specific resources by users; (2) excessive incorrect Server-User-Resource allocation error rate, such that compliance with a 'Service Level Agreement' (SLA) guaranteeing a particular response-time criterion or other performance measure is often violated; (3) inadequate accommodation of Server-User-Resource access pattern discovery in systems that have very high-cardinality userships, very high-dimensionality resource sets, numerous servers on which the resources are hosted and upon which users' accesses impinge, and high-frequency access rates to resources by users; (4) difficulty in discovering which combinations or clusters or groupings of resources can be reasonably allocated to which Servers based on access frequency, median access duration, or other measures of utilization intensity of the resources by users whose activity is incident upon a particular server; (5) difficulty in discovering which combinations or clusters or groupings of users can be reasonably allocated to which servers based on access frequency, median access duration, or other measures of utilization intensity by the user of the resources located on a particular server; (6) failure of conventional system management methods to enable allocations of users and resources to servers to be easily revised as needed over passing time, with confidence that such revised allocations are highly likely to result in superior response-time or other performance characteristics such as will assure compliance with an applicable Service Level Agreement (SLA).

It is therefore valuable to establish a method for ameliorating these limitations and providing minimal allocation error and allocations that increase the efficiency and flexibility of the system, for example, to maintain the uptime, availability, and response time of a system, particularly when the number of concurrent users accessing resources is large. In some aspects, the system can be dynamically adjusted to keep up with any number of Service Level Agreement (SLA) requirements. As such, both short-term and long-term patterns of access to resources by a user or client device may be analyzed.

Accordingly, it is highly desirable and valuable to provide embodiments of the systems and methods described herein, for optimizing user-resource allocations to servers that takes advantage of recurrent patterns of access, such as information that is available through session logs within a computing system. In some embodiments, portions of resources can be allocated to the users engaging in the most transactions (or most intensity) for that resource. It will be appreciated that within large transactional systems, Dynamically partitioning a set of resources among a plurality of client organization licensees and their respective users is desirable and valuable, to provide economies-of-scale through resource-sharing in such a manner that the total cost of ownership (TCO) is as low as possible for the client licensees whose business activity is hosted on such remote-hosted systems, communications switches, and server farms. The aim of the present invention is to automatically discover and rank a plurality of feasible combinations of remotely-hosted clients that, if their computational loads were aggregated together on a shared set of servers (or, for that matter, human support resources, etc.), the combinations would represent harmonious, highly cost-efficient allocations or aggregates.

Large-scale 'grid' computing is capable of delivering reduced costs through sharing of resources, spreading the use of large-capacity resources among many client organizations. Those practiced in the art currently identify candidate aggregate sets whose loads are 'complementary' to each other and who thereby, in aggregate, present modest loads to the computing resources that are assigned to the sets in an ad hoc fashion. Despite the fact that there are a variety of algorithms and systems for short timescale load-balancing of generic application loads presented to ASP server farms, to date there have been no methods for: consistently, predictably, and reliably identifying aggregate load-sets that have optimal resource utilization and performance properties on a longer timescale of days to months; nor for rank-ordering alternative aggregate sets of clients and applications that are nonfungible (nongeneric, on account of differing business-rules requirements) according to a numerical figure-of-merit valid for long timescales, for the purpose of making optimal assignments to dedicated resource-sets.

Combinations or aggregate loads whose peaks in CPU or memory or I/O read-write rates are additive and occur at the same times and days-of-week should be avoided, insofar as inter-client contention for the finite resources will make the amount of resources needed to deliver a given level of performance according to contract worse-than-linearly greater (as an aggregated computational load) than the amount of resources for each of them to be hosted individually. Furthermore, combinations whose valleys or troughs in CPU or memory or I/O occur at the same times should also be avoided, or the system-idle unused capacity and cost-effectiveness (and total cost of ownership, TCO) for the aggregate will likewise be worse for such clients combined together than had they been hosted individually on separate (smaller-capacity) equipment.

In general, such a classification and allocation of users and resources to servers are not performed just once, which would leave the allocations static. For example, Clients utilizing a large system may have service mix changes, for example, yearly or quarterly. Clients add and subtract staff (and, hence, concurrent users), based on competitive pressures in their local catchment area, for example in the healthcare market they service. Each client's production application solution mix evolves over time and, with each solution 'go-live', there are dramatic changes in that client's loads impinging on the server farm. For example, a client's application logic and/or business logic may change on a consistent basis.

Therefore, it is advantageous to continuously measure each client's activity and calculate rebalanced optimal allocations on a frequent basis (e.g., minute-wise averages through the course of each day)—and making re-allocation decisions and changes frequently. The re-allocation decisions may be taken according to a schedule (synchronously; periodically; e.g., quarterly), or on an event-driven/performance-degradation-driven basis (asynchronously; aperiodically).

Web servers comprising a server farm on a network are adapted for logging detailed runtime information regarding client user transactions and system performance parameters to a database, and therefore the historical-load activity measurements upon which to base such calculations are readily available for existing remotely hosted and ASP systems. The system and method disclosed herein interact with such existing databases, to collect and combine the load log files, process the combined files, and create a quantitative metric by which the quality and future performance characteristics of potential client combinations that may be entertained for the purpose of large-scale resource-sharing.

Some embodiments of the invention are accomplished using a computer running the Linux operating system, the open-source statistical software package R, and the R modules ade4, indicspecies, and cluster. Alternatively, a cloud-based computing configuration can be utilized as well.

Figure 1A:
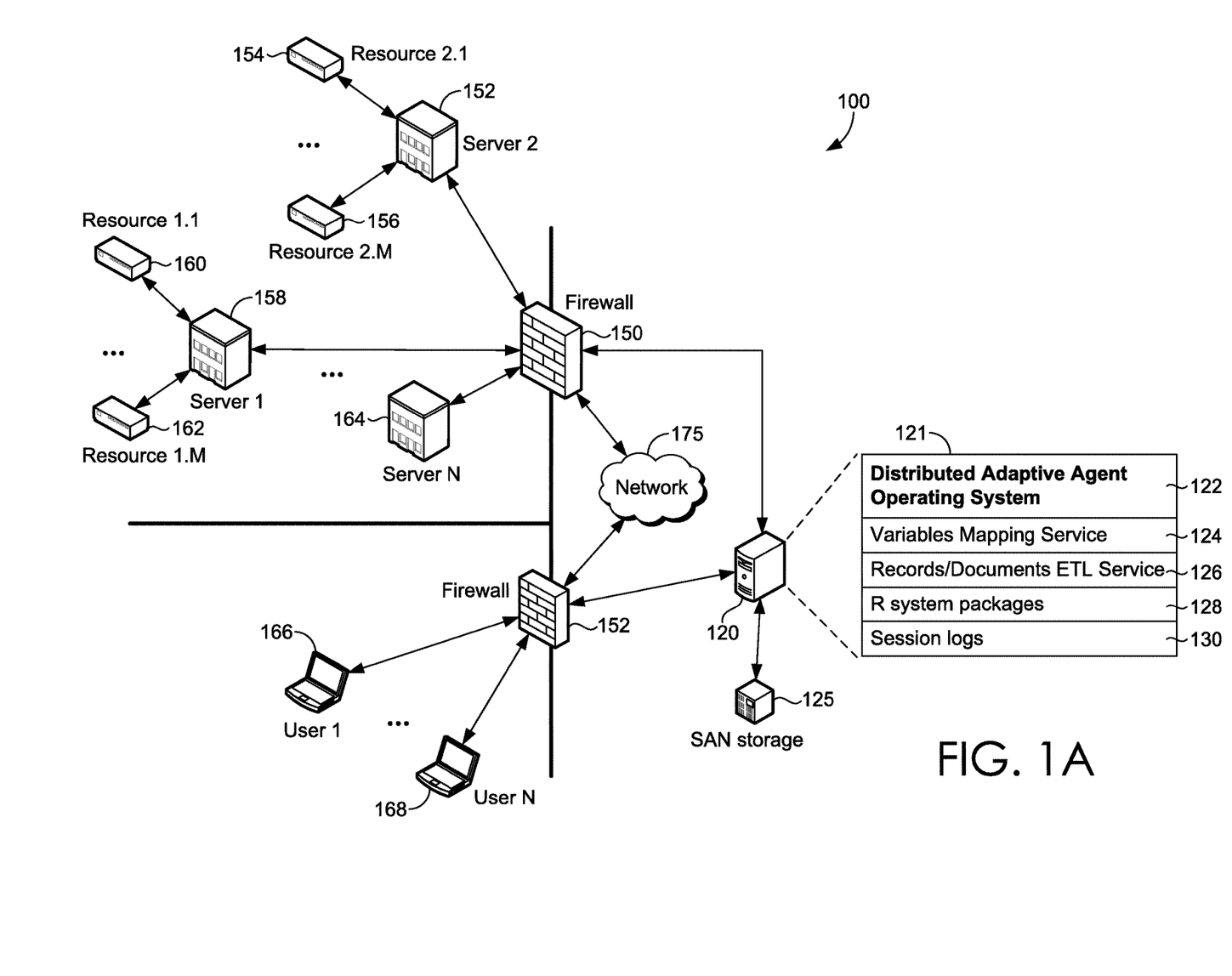
FIGS. 1A and 1B depict aspects of an exemplary operating environment suitable to implement an embodiment of the invention.

Turning now to FIG. 1A there is presented an example operating environment 100 suitable for practicing embodiments of the invention. Example operating environment 100 includes a computerized system for compiling and optimizing user-resource allocations to servers based on access patterns and characterization. With reference to FIG. 1A, one or more electronic health record (EHR) systems or servers 152, 158, 164 are communicatively coupled to network 175 and computer system 120, behind firewall 150. In an embodiment, network 175 includes the Internet, a public network, or a private network.

Example operating environment 100 also includes firewall 152 between user access systems 166, 168, computer system 120, and network 175. Although environment 100 includes firewalls 150 and 152, it is contemplated that some operating environments may not have firewalls. In embodiments having a firewall, the firewall may reside on a component between the component and network 175, such as on a server (not shown) or may reside on the component. Thus, in some embodiments, firewall 150 or 152 may comprise a separate firewall associated with each component (or some components) shown communicatively coupled to the firewall.

Embodiments of electronic health record (EHR) systems or servers 152, 158 can include one or more data stores or associated system hosted resources, such as resources 154, 156, 160, 162. Firewall 150 may comprise a separate firewall associated with each EHR system, in some embodiments. Furthermore, in some embodiments, one or more EHR systems or servers 152, 158 may be located in the cloud or may be stored in data stores that are distributed across multiple physical locations. In some embodiments, EHR systems or servers 152, 158 further include record systems which store real-time or near real-time patient information, such as wearable, bedside, or in-home patient monitors, for example.

Example operating environment Resources 154, 156, 160, 162 can be allocated to any one or more servers on the system, for example, servers 158 and 152. It will be appreciated that resources may be allocated to different servers (e.g. server 164) in accordance with various embodiments of the present invention, for example, if the computer system is scaled.

Example operating environment 100 further includes user access systems 166, 168 communicatively coupled to the one or more EHRs or servers 152, 158. Embodiments of user access systems 166, 168 may take the form of a user interface operated by a software application or set of applications on a client computing device such as a personal computer, laptop, smartphone, or tablet computing device. In one embodiment, the application(s) is a web-based application or applet. User access systems facilitate accessing, retrieving, and modifying information related to a specific patient or set of patients.

Example operating environment 100 further includes computer system 120, which may take the form of a server, which is communicatively coupled to servers 152 and 158 and also to user access systems 166 and 168. It will be appreciated that user access systems may also comprise accessing systems, rather than a human user.

Computer system 120 comprises one or more processors operable to receive instructions and process them accordingly, and may be embodied as a single computing device or multiple computing devices communicatively coupled to each other. In one embodiment, processing actions performed by system 120 are distributed among multiple locations such as a local client and one or more remote servers. In one embodiment, system 120 comprises one or more computing devices, such as a server, desktop computer, laptop, or tablet, cloud-computing device or distributed computing architecture, a portable computing device such as a laptop, tablet, ultra-mobile P.C., or a mobile phone.

Embodiments of computer system 120 include computer software stack 121, which in some embodiments operates in the cloud, as a distributed system on a virtualization layer within computer system 120. Some embodiments of software stack 121 include a distributed adaptive agent operating system 122, which may be implemented as a platform in the cloud, and which is capable of hosting a number of services such as 124, 126, 128, and 130. Embodiments of services 124, 126, 128, and 130 run as a local or distributed stack in the cloud, on one or more personal computers and servers such as 120, and/or a user computing device 166, 168. In one embodiment, the resources 154, 156, 160, and 162, the servers 152, 158, and the user devices 166, 168 operate in conjunction with software stack 121.

In embodiments, variables mapping service 124 and Records/Documents ETL service 126 provide services that facilitate retrieving frequent item sets, extracting database records, and cleaning the values of variables in records. In some embodiments, these services invoke software services 128. Software services 128 perform statistical software operations, and include statistical calculation packages such as, in one embodiment, the R system (the R-project for Statistical Computing, which supports R-packages or modules tailored for specific statistical operations, and which is accessible through the Comprehensive R Archive Network (CRAN) at http://cran.r-project.org); R-system modules or packages including TraMineR or similar services for facilitating trajectory mining, and arulesSequences or similar services for facilitating operations, such as K-means clustering calculations. Session logs services 130 can comprise one or more facilities to track changes and/or access records made during each session invoked through the computing system 120. Session logs tracking time series data, such as accesses by a plurality of users over a plurality of servers may be stored and updated real time, for example using data store 125. In some embodiments data store 125 comprises the data stores associated with the one or more server systems, such as 152 and 158, and user access systems 166 and 168. Further, although depicted as a single data store, data store 125 may comprise one or more data stores, or may be in the cloud.

Figure 1B:
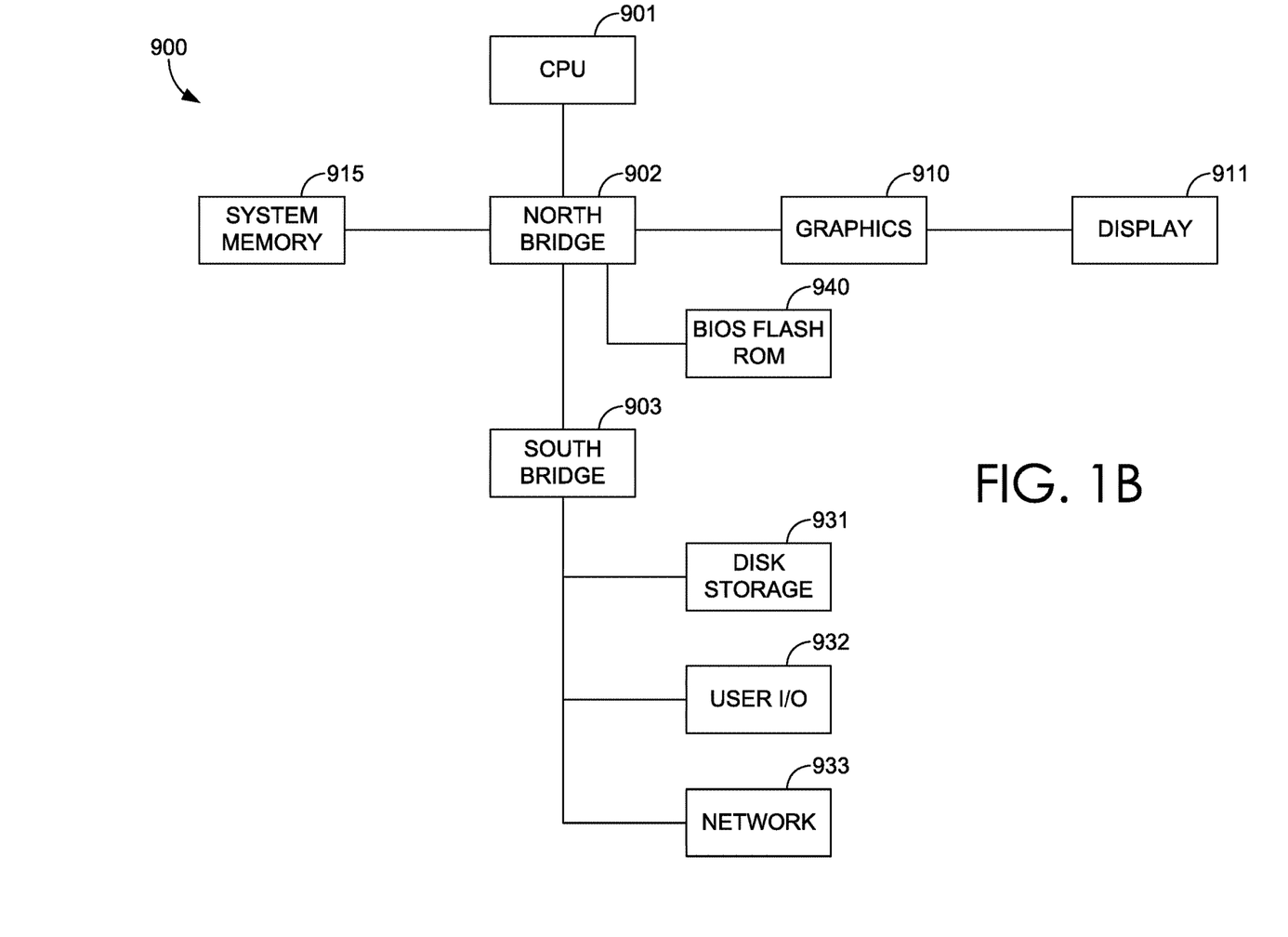

Turning now to FIG. 1B, there is shown one example of an embodiment of computer system 900 that has software instructions for storage of data and programs in computer-readable media. Computer system 900 is representative of a system architecture that is suitable for computer systems such as computer system 120 of FIG. 1A, and the computer device(s) 166, 168, servers 152, 158, and resources 154, 156, 160, and 162, in some embodiments. One or more CPUs such as 901, have internal memory for storage and couple to the north bridge device 902, allowing CPU 901 to store instructions and data elements in system memory 915, or memory associated with graphics card 910, which is coupled to display 911. Bios flash ROM 940 couples to north bridge device 902. South bridge device 903 connects to north Bridge device 902 allowing CPU 901 to store instructions and data elements in disk storage 931 such as a fixed disk or USB disk, or to make use of network 933 for remote storage. User I/O device 932 such as a communication device, a mouse, a touch screen, a joystick, a touch stick, a trackball, or keyboard, couples to CPU 901 through south bridge 903 as well. The system architecture depicted in FIG. 1B is provided as one example of any number of computer architectures, such as computing architectures that support local, distributed, or cloud-based software platforms, and are suitable for supporting computer system 120 of FIG. 1A.

In some embodiments, computing system 900 is a computing system made up of one or more computing devices. In an embodiment, computing system 900 includes an adaptive multi-agent operating system, but it will be appreciated that computing system 900 may also take the form of an adaptive single agent system or a non-agent system. Computing system 900 may be a distributed computing system, a data processing system, a centralized computing system, a single computer such as a desktop or laptop computer or a networked computing system.

In some embodiments, computing system 900 is a multi-agent computer system with software agents. A multi-agent system may be used to address the issues of distributed intelligence and interaction by providing the capability to design and implement complex applications using formal modeling to solve complex problems and divide and conquer these problem spaces. Whereas object-oriented systems comprise objects communicating with other objects using procedural messaging, agent-oriented systems use agents based on beliefs, capabilities and choices that communicate via declarative messaging and use abstractions to allow for future adaptations and flexibility. An agent has its own thread of control which promotes the concept of autonomy.

Figure 2:
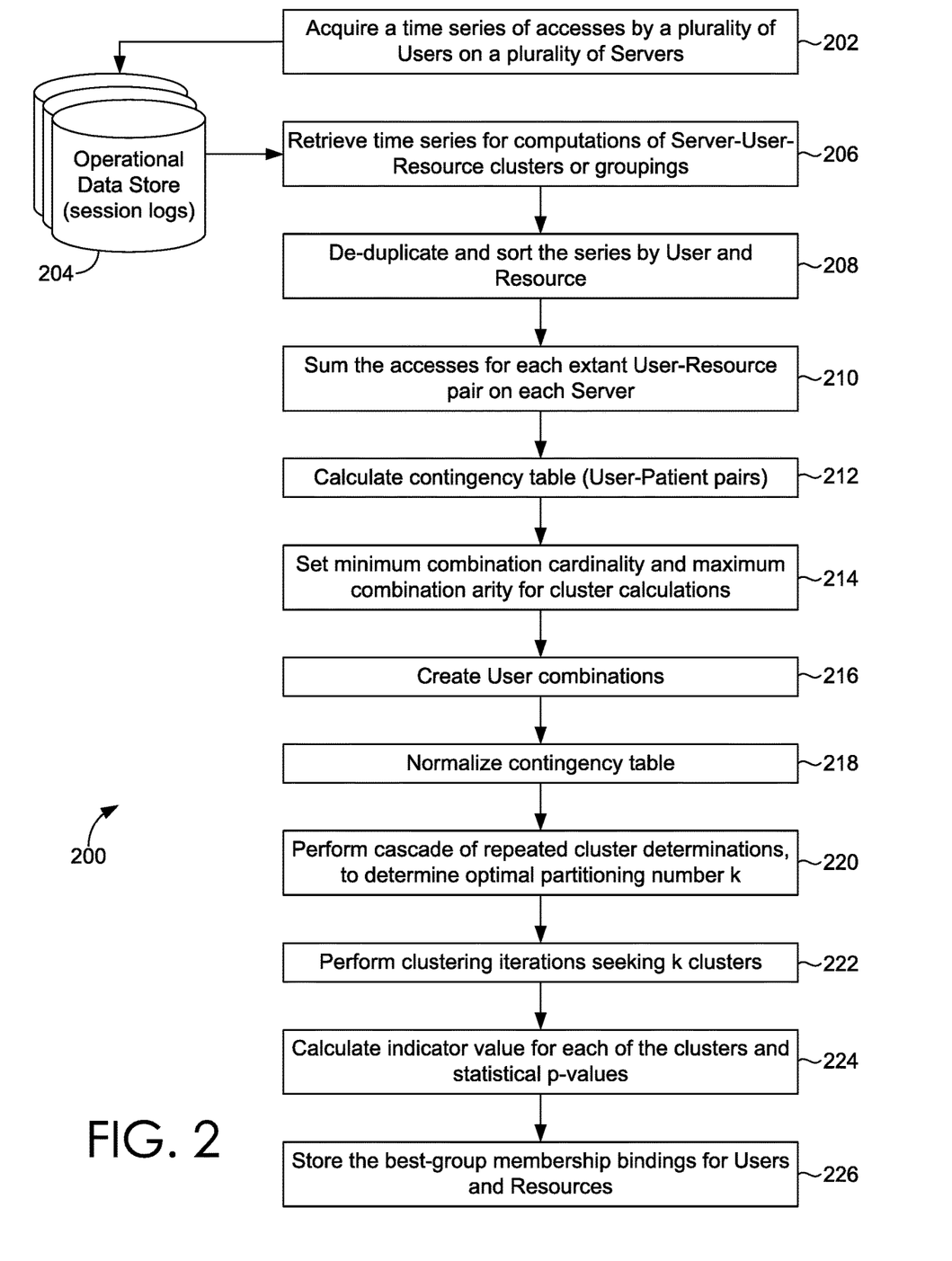
FIG. 2 is a flow diagram which illustrates an exemplary system and method for generating the user-resource clusters, in accordance with an embodiment of the invention.
Figure 3A:
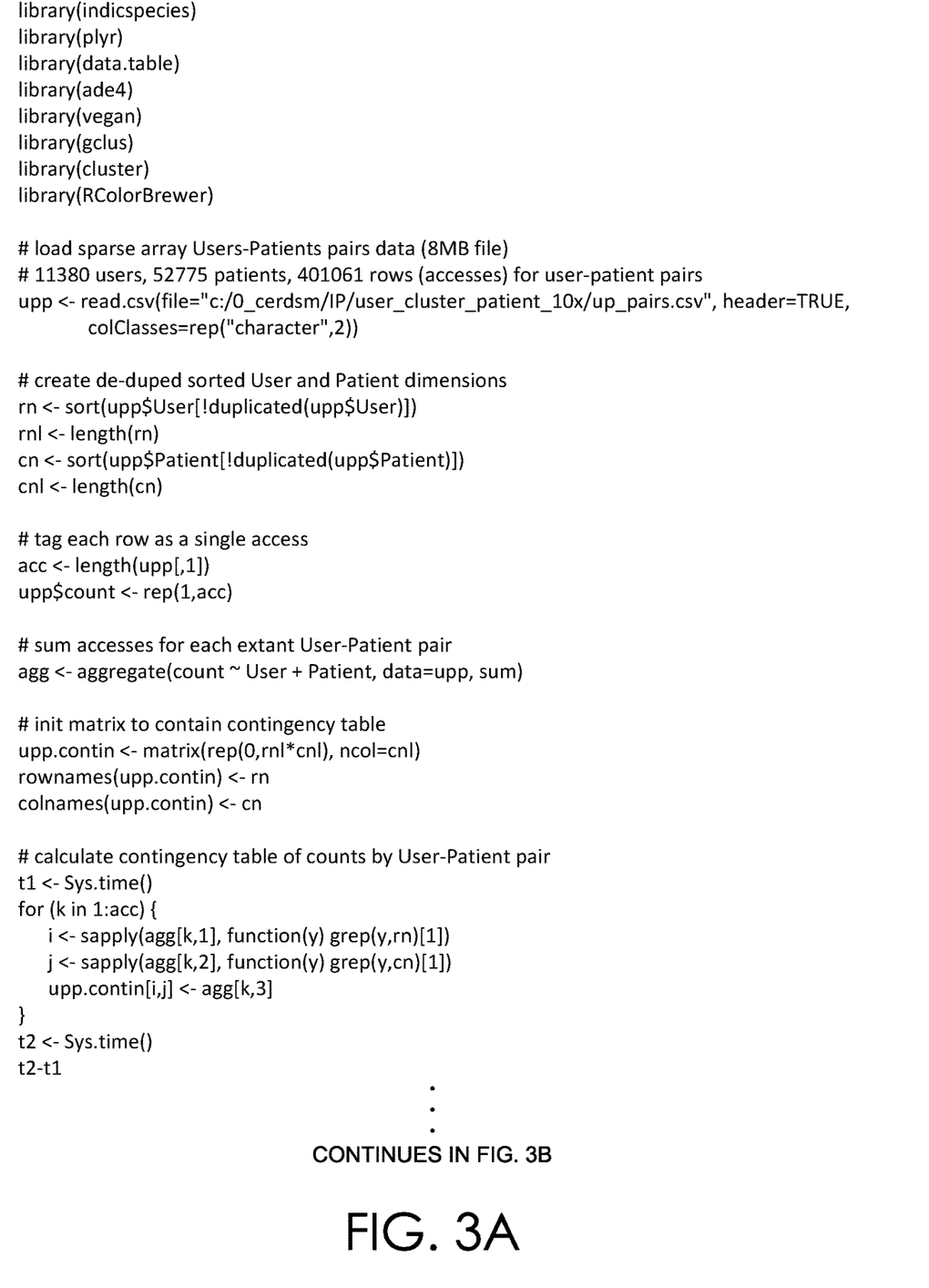
FIGS. 3A-3D illustratively provide an example embodiment of a computer program routine for generating the user-resource clusters and determining statistical p-values for ascertaining the strength of association of users and resources to said cluster groupings, in accordance with an embodiment of the invention.
Figure 3B:
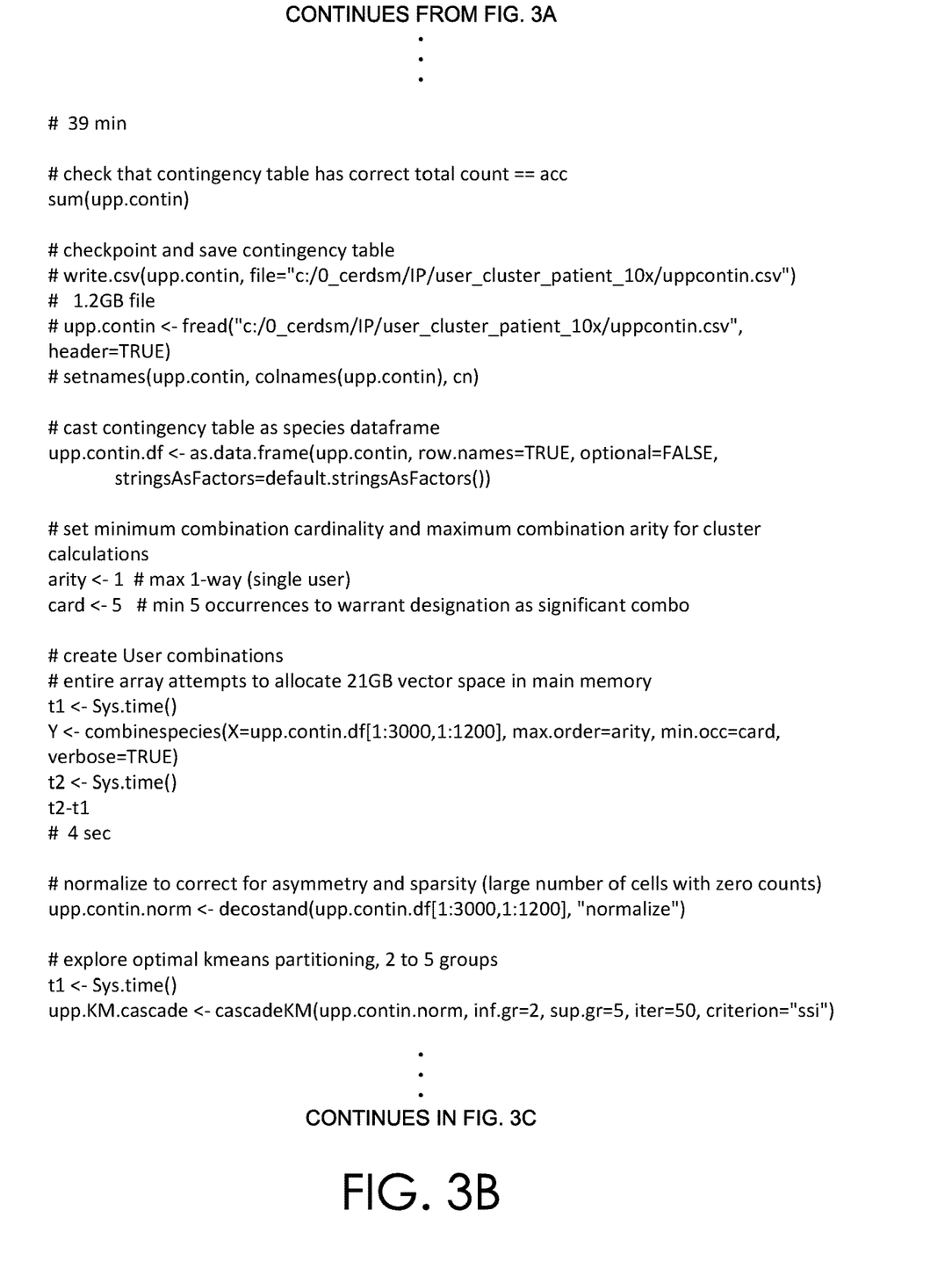
Figure 3C:
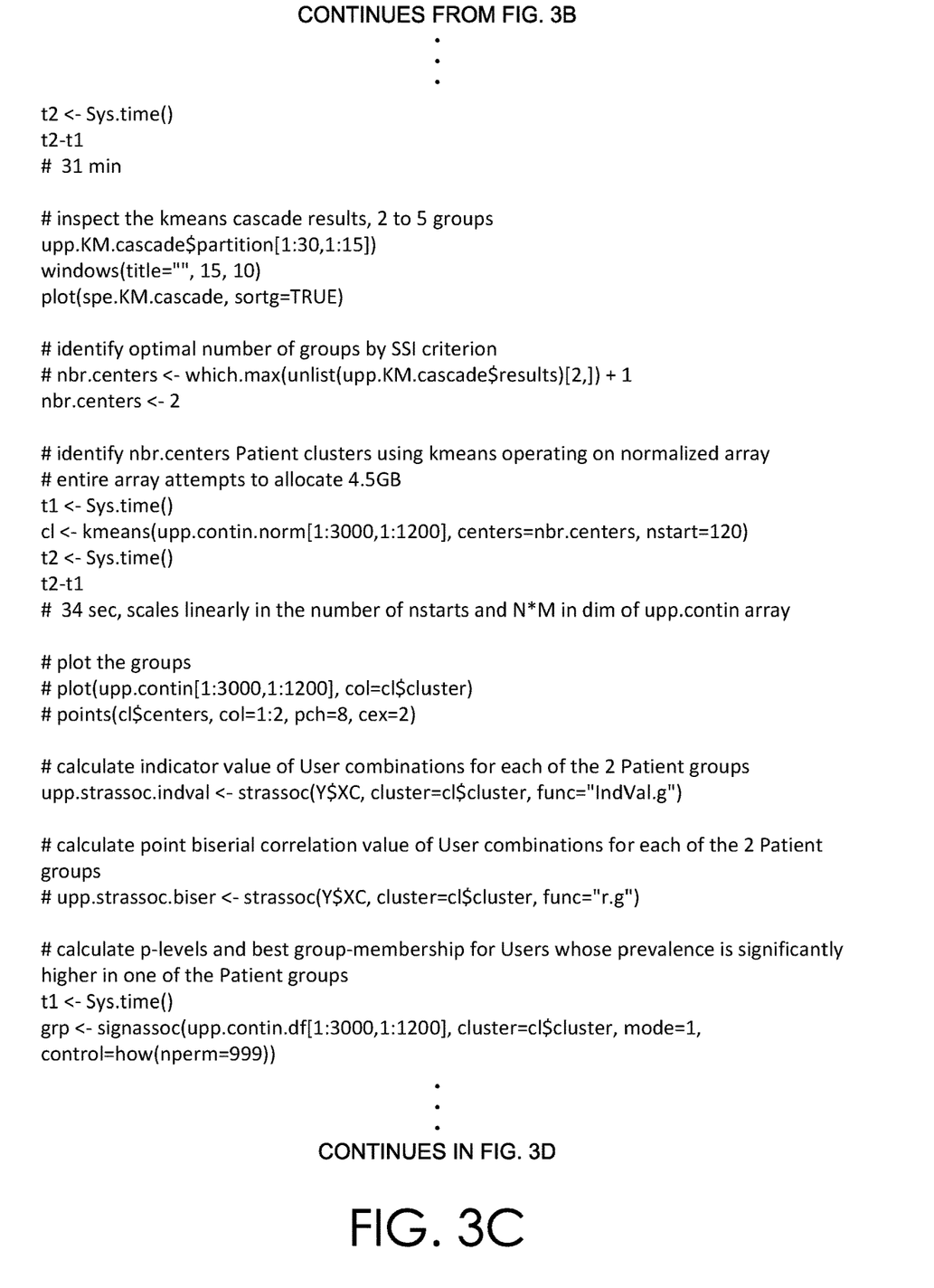
Figure 3D:
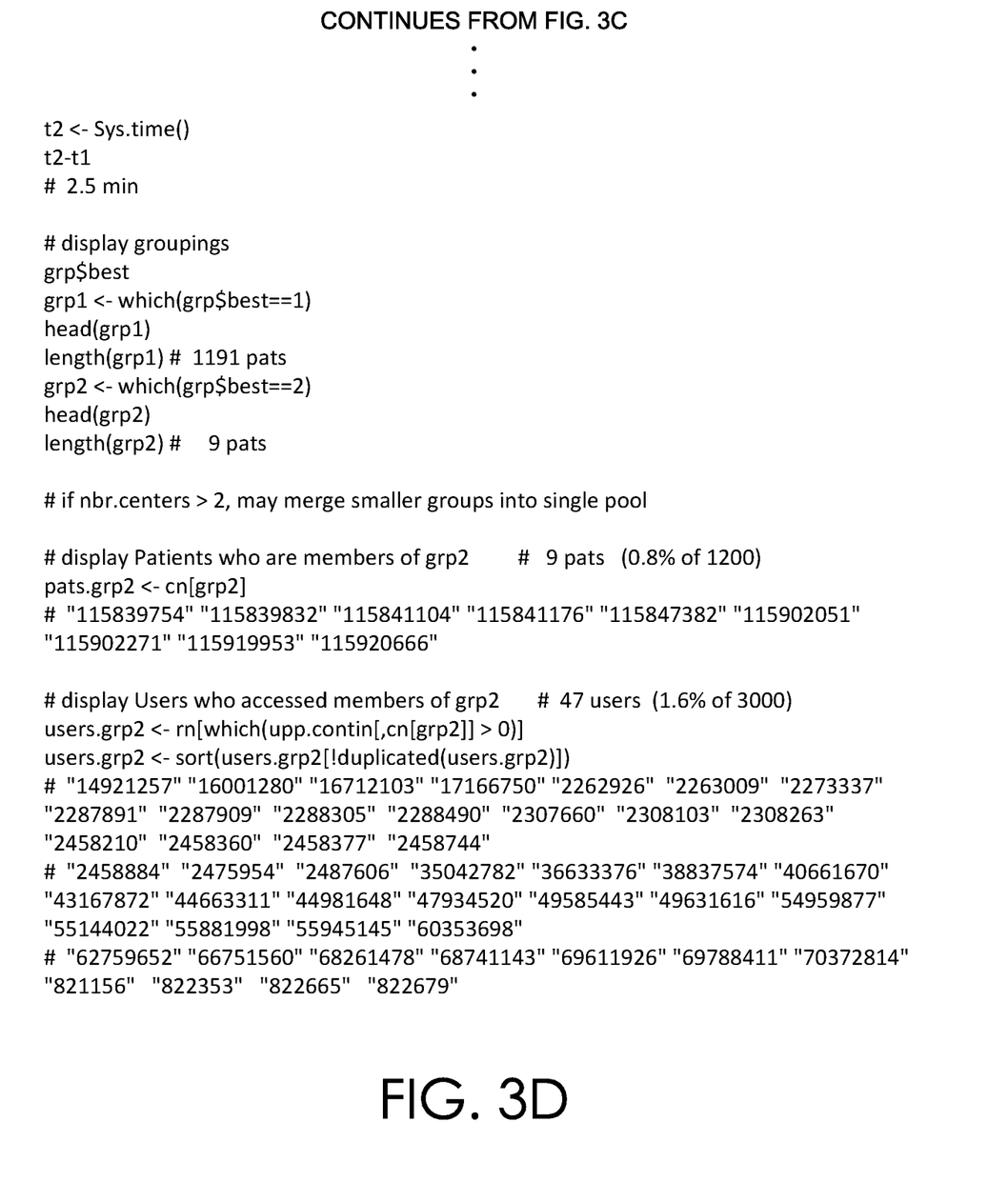

Turning now to FIG. 2, a flow diagram is provided for an embodiment of a method for user-resource allocations to servers based on access patterns, and referred to generally herein as method 200. Access patterns imply recurrent combinations of computer system users (e.g. through user access systems 166 and 168 of FIG. 1) and system-hosted resources (e.g. resources 154, 156, 160, 162 of FIG. 1 which in some embodiments may be EHR resources). Accordingly, an objective in some embodiments is to determine clusters of those user-resource combinations and establish the strength of association for each cluster in order to optimally allocate users and resources to servers. Frequently accessed resources can in turn be co-located or cached (thus reducing access time and system latency) and frequently accessing users can obtain the resources they require without encountering system bottlenecks or latency. As such, in some embodiments, system tuning can be managed in a way that recognizes characteristic requirements associated with access patterns or a user.

With reference to FIG. 2, some embodiments use a operational data store 204 that store session logs associated with the computing system. The session logs can comprise sequences of data that associate users and resources accessed or modified along with their time-stamps. In some embodiments, sequences can be enumerated via temporal joins or intersections. Additionally, some embodiments use a sparse-matrix approach to decompose the original search space (lattice) into smaller pieces (sub-lattices) which can then be processed independently, either in main-memory on a single processor or in distributed memory on multiple parallel processors. In this manner, embodiments previously requiring three database scans, require only a single scan with some pre-processed information, thus minimizing I/O costs. In some embodiments, the problem decomposition is decoupled from the pattern search. Thus some embodiments utilize two different search strategies for enumerating the frequent sequences within each sublattice: breadth-first and depth-first search, according to algorithms that are known to those practiced in the art. In some embodiments, resource consumption measurements, resource access measurements, or any other measurement of resource use may be obtained for any number or servers in operable communication with the system (e.g. via network 175 of FIG. 1A). Over any given time, measurements pertaining to the resources, the users accessing the resources, or the devices requesting the resources can be known (e.g. using session logs 130 of FIG. 1A).

At step 202 of method 200, a time-series of resource access measurements (e.g. access frequency, access duration) for a plurality of users or clients on a plurality of servers is acquired and stored on operational data store 204, for example as session logs. The time-series can be built and stored over any interval of time. At step 206, a time-series of resource access measurements (e.g. access frequency) for a plurality of users on a plurality of servers is retrieved. The retrieved time-series can be based on a time interval and retrieved through any known method of data mining. In this way, for example, historical log files containing raw time-based user-resource-server session information is obtained. In some embodiments, the time-series can be retrieved periodically at some predetermined time interval in order to ensure recently updates logs.

At step 208, the received dine-series is de-duplicated and sorted by user and resource. In various embodiments resources can be user or client resources or they can be patient resources. As such sorting may be done by user, by patient, by another resource used. At step 210, the access frequency for each extant user-resource pair for each server is summed. At step 212, a contingency table is generated, the cells of the contingency table containing access counts to resources or portions of resources by each user-patient pair. In one example, by using user-patient pairs, a measurement of resource utilization can be obtained.

Continuing to step 214, a minimum combination cardinality and/or a maximum combination arity of user groupings can be set for the contingency table, for example as one or more threshold values. In other words, the minimum combination cardinality of accesses considered sufficient for purposes of frequent access grouping determinations is set and the maximum combination arity of user groupings for cluster calculation and generation is set. In various embodiments the values may manually set and maintained statically or alternatively, the values may be derived from system determinations and continuously set, for example based on system feedback. At step 216, user combinations can be determined or created based on any one of the parameters set at step 214, for example user-resource combinations can be created. In this way, users can be viewed in terms of resources or portions of resources and vice-versa.

At step 218 the contingency table can be normalized to correct for asymmetry and sparsity within the table (e.g. to correct for large numbers of table entries with zero counts). Normalization can thus reduce data redundancy and improve data integrity, and can for example be accomplished through synthesis or decomposition. Table normalization can for instance remove outliers and/or scale any portion from zero to unity.

At step 220, a cascade evaluation of repeated cluster determinations can be performed on the normalized contingency table to find the optimum number of clusters (determined clusters k), or alternatively the optimal portioning number for the data set. At step 222, a number of clustering iterations can then be performed seeking k clusters found in step 220 in order to determine clusters of, for example, client-resource or user-resource combinations. In various embodiments cluster determinations can be made through by k-means clustering, spectral clustering, or other clustering methods (e.g. Markov cluster algorithm). Alternative clustering may also be used, for example, partition-by-medoids non-hierarchical clustering, Ward's minimum-variance clustering, agglomerative clustering, and single linkage clustering, among others. It will be appreciated that by using a larger number of permutations during clustering, numerical stability may be ascertained and the statistical precision of group assignments can be improved over the optimum number of clusters found via step 220.

At step 224, indicator values for each of the determined clusters can be calculated, and for example, associated with each user combination. An indicator value can, for one, represent a quantitative index measuring the statistical alliance of a species to any one of the classes in a classification of sites. An indicator value (e.g. determined by through Legendre indicator value analysis) may the statistical significance of the associations within a cluster. Further statistical p-values are calculated for each user combination in relation to a given cluster (e.g. through a Sidak test, F-test, or any other test for variance) and can also be used in determining that a given cluster is statistically significant. In some embodiments, it may be a goal to minimize cross-cluster communication Further, at step 226 best group membership for one or more users can be determined (e.g. users whose prevalence of accesses is significantly higher in one of the resource clusters than in others). At step 226, the users and resources can be bound to the group membership, and stored for subsequent use, for example in allocating or re-allocating users and resources to servers.

In an illustrative example, a series was collected, consisting of 401,062 accesses (sessions with user-resource bindings) by 11,380 distinct users against resources consisting of the electronic health records of 52,775 patients in a large health system (i.e. distinct resources or patients whose EHR records were accessed). The dataset was transformed to a contingency table comprising a 2-dimensional array with rows denoted by unique users and columns denoted by unique patients. The cells contained the cumulative count of accesses of each user-patient pair in the series.

The contingency table was normalized and an optimal number of groupings was determined by iterative k-means cluster calculations in R for cluster sizes k ranging from 2 to 10. Assessment of the figure of merit of each cluster size k was performed using the 'Simple Structure Index' (SSI). Then, using the optimum value of k established in the previous step, kmeans clustering was performed once again, using a larger number of permutations to provide greater numerical stability and precision of the result. In this example, two characteristic user-resource combination clusters were identified, one group determined to constitute general activities, and one group determined to constitute intense collaboration activities.

Robust statistical methods can also be used to produce p-values to establish statistical significance of the serveruser-resource groupings, such as are known to those practiced in the art. In some embodiments, parametric F-test and Šidak test measures can be utilized. These measures resolve how strong is the statistical association of each resource and user with the group to which each is assigned by the system and method.

In an embodiment, a method of network resource allocation is provided, comprising: collecting resource consumption measurements of a plurality of back-end server devices, wherein each back-end server device is allocated to at least one of a plurality of client devices to form a plurality of existing server-client combinations to process requests from the plurality of client devices; determining whether the resource access frequency measurements of each existing server-client combination during a first time period meets a service level agreement requirement; calculating server-client-resource combinations based on groupings of client users and resources accessed most frequently; creating possible server-client-resource combinations comprising combinations of each of the back-end server devices and the client devices and the resources; determining whether the possible server-client-resource access load of each for the possible server-client-resource combinations meets the service level agreement requirement; and reallocating each back-end server device to at least one client device and at least one resource based on the existing server-client-resource combinations.

In an embodiment, determining whether the resource consumption measurements of each server-client combination during a first time period meets a service-level agreement requirement further comprises: summing the resource access frequency measurements collected during the first time period for each server-client-resource combination; and determining whether the summed resource access measurements for each server-client combination meets the service level agreement requirement.

In an embodiment, creating possible server-client combinations further comprise: determining an application mix and business rules of all of the client devices in one of the possible server-client combinations are not compatible; and removing the one of the possible server-client combinations from the possible server-client combinations.

In an embodiment, determining whether the possible server-client load for each of the possible server-client-resource combinations meets the service level agreement requirement further comprises: summing the possible server-client-resource load of each of the possible server-client-resource combinations during the first time period; and determining whether the summed possible server-client-resource set load for each of the possible server-client-resource combinations meets the service level agreement requirement.

In an embodiment, calculating a possible server-client-resource combination further comprises calculating a statistical strength of association measure for each possible server-client-resource combination. In an embodiment, calculating a possible server-client-resource combination further comprises calculating a statistical significance level measure for each possible server-client-resource combination.

In an embodiment, a system for network resource allocation is provided, comprising: a controller configured to collect resource consumption measurements of a plurality of back-end server devices, wherein each back-end server device is allocated to at least one of a plurality of client devices and accessed resources to form a plurality of existing server-client-resource combinations to process requests from the plurality of client devices and resources; determine whether the resource consumption measurements of each existing server-client combination during a first time period meets a service level agreement requirement; calculate an existing server-client-resource combination based on whether the resource consumption measurements of each existing server-client-resource combinations meets the service level agreement requirement; create possible server-client-resource combinations comprising random unique combinations of each of the back-end server devices and the client devices and resources; determine a possible server-client-resource load for each of the possible server-client combinations based on the resource consumption measurements collected during the first time period; determine whether the possible server-client-resource load of each for the possible server-client combinations meets the service level agreement requirement; calculate a possible server-client-resource combination based on whether the possible server-client load of each possible server-client-resource combination meets the service level agreement requirement; and reallocate each back-end server device to at least one client device based on the existing server-client-resource combination and the possible server-client-resource combination when the resource consumption measurement of each existing server-client-resource combination does not meet a service-level agreement requirement and when the possible server-client-resource load for each of the possible server-client-resource combinations meets the service level agreement requirement.

In an embodiment, the controller is further configured to sum the resource consumption measurements collected during the first time period for each server-client-resource combination and determine whether the summed resource consumption measurements for each server-client-resource combination meets the service level agreement requirement.

In an embodiment, the controller is further configured to determine whether an application mix and business rules of all of the client devices in one of the possible server-client-resource combinations are compatible, and when the application mix and the business rules are not compatible, remove the one of the possible server-client-resource combinations from the possible server-client-resource combinations.

In an embodiment, the controller is further configured to sum the possible server-client load of each of the possible server-client-resource combinations during the first time period and determine whether the summed possible server-client-resource set load for each of the possible server-client-resource combinations meets the service level agreement requirement.

In an embodiment, the controller is further configured to calculate an existing server-client-resource combination further comprises calculating a statistical association measure for each existing server-client-resource combination.

In an embodiment, the controller is further configured to calculate a possible server-client combination further comprises calculating a statistical significance measure for each possible server-client-resource combination.

In an embodiment, the controller is further configured to reallocate each back-end server to at least one client is further based on the statistical association measure for each existing server-client-resource combination.

In an embodiment, the optimal number of groups is established by maximizing a quality metric, such as Simple Structure Index (SSI), Calinski Index, Hartigan Index, Ratkowsky Index, Ball Index, Scott Index, Marriot Index, Friedman Index, or Rubin Index.

In an embodiment, the discovery of relevant clusters involves kmeans clustering, spectral clustering, or other algorithms. In an embodiment, discovery of relevant clusters involves calculations on singleton, pairwise, or higher-order (arity >2) combinations of users.

In an embodiment, the identification of statistically significant clusters is accomplished by calculating p-values for measures of association, including F-test or Sidak test.

Although the invention has been described with reference to the embodiments illustrated in the attached drawing figures, it is noted that substitutions may be made and equivalents employed herein without departing from the scope of the invention as recited in the claims. For example, additional steps may be added and steps omitted without departing from the scope of the invention.

Many different arrangements of the various components depicted, as well as components not shown, are possible without departing from the spirit and scope of the present invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention.

It will be understood that certain features and subcombinations are of utility and may be employed without reference to other features and subcombinations and are contemplated within the scope of the claims. Not all steps listed in the various figures need be carried out in the specific order described.

What is claimed is:

1. A method of network resource allocation, comprising:
   obtaining resource access measurements for one or more servers, the servers comprising one or more allocated resources, wherein each server is in operable communication with at least one allocated client device, the at least one allocated client device requesting at least a portion of the one or more allocated resources;
   generating clusters of client-resource combinations based on the obtained resource access measurements;
   determining clusters of client-resource combinations based on the obtained resource access measurements;
   calculating server-client-resource combinations based on the determined clusters, wherein an indicator value for each determined cluster is calculated to optimize the strength of associations of server-client-resource combinations with respect to the determined clusters; and
   reallocating at least one client device and at least one resource to the one or more servers based on calculated server-client-resource combinations.

2. The method of claim 1, further comprising determining resource consumption measurements meet a service level agreement requirement.

3. The method of claim 1 further comprising determining a load for each server-client-resource combination.

4. The method of claim 3, further comprising determining the load for each server-client-resource combination meets a service level agreement requirement.

5. The method of claim 1, wherein determining clusters of client-resource combinations comprises generating a contingency table based on the client-resource combinations.

6. The method of claim 1, wherein determining clusters of client-resource combinations further comprises repeating cluster determinations to determine an optimal partitioning number.

7. The method of claim 6, wherein the cluster determination are performed by k-means clustering.

8. The method of claim 1, wherein calculating server-client-resource combinations further comprises calculating a statistical strength of association for each client-resource combination.

9. The method of claim 1, wherein calculating server-client-resource combinations further comprises calculating a statistical significance for each client-resource combination.

10. The method of claim 1, further comprising determining at least one theoretical server-client-resource combination based on the determined clusters.

11. A system for network resource allocation comprising:
   one or more processors; and
   one or more computer storage storing computer-usable instructions that, when executed by the one or more processors, cause the one or more processors to:
   obtain, by a controller, a plurality of resource access measurements for one or more servers, the servers comprising one or more allocated resources, wherein each server is in operable communication with at least one client device requesting at least a portion of the one or more allocated resources;
   generate clusters of client-resource combinations based on the obtained resource access measurements;
   determine at least one theoretical server-client-resource combination based on the generated clusters;
   calculate an optimal server-client-resource combination from the theoretical server-client-resource combinations, wherein an indicator value for each determined cluster is calculated to optimize the strength of associations of server-client-resource combinations with respect to the determined clusters;
   reallocate at least one client device and at least one resource to the one or more servers based on the optimal server-client-resource combination.

12. The system of claim 11, further configured to calculate one or more existing server-client-resource combinations.

13. The system of claim 12, further configured to: sum the resource access measurements for the one or more servers.

14. The system of claim 11, further configured to:
   determine whether application and business logic associated with all of the client devices in a first theoretical server-client-resource combination is compatible; and
   remove the first theoretical server-client-resource combination from the theoretical server-client-resource combinations if it is not compatible.

15. The system of claim 11, further configured to calculate a statistical association for each client-resource combination.

16. The system of claim 15, further configured to reallocate the at least one client device and the at least one resource to the one or more servers based on the statistical association.

17. The system of claim 11, further configured to determine an optimal number of clusters by maximizing a quality metric.

18. The system of claim 11, wherein the clusters are generated by at least one of k-means clustering, spectral clustering, or Markov Clustering Algorithm.

19. The system of claim 11, further configured to determine significant clusters from the generated clusters by calculating a p-value for at least one generated cluster.

20. The system of claim 11, wherein the resource access measurements are a time-series of the frequency each resource is accessed by each client device.

* * * * *

UNITED STATES PATENT AND TRADEMARK OFFICE
CERTIFICATE OF CORRECTION

| | | |
|---|---|---|
| PATENT NO. | : 10,944,687 B1 | Page 1 of 1 |
| APPLICATION NO. | : 16/504519 | |
| DATED | : March 9, 2021 | |
| INVENTOR(S) | : Douglas S. McNair | |

It is certified that error appears in the above-identified patent and that said Letters Patent is hereby corrected as shown below:

In the Specification

Column 04, Lines 58-59: Please remove "It will be appreciated that within large transactional systems,".

Column 09, Line 36: Please remove "dine-series" and replace with --time-series--.

Column 10, Line 36: Please remove "communication" and replace with --communication.--.

Column 10, Line 59: Please remove "kmeans" and replace with --k-means--.

Column 13, Line 02: Please remove "kmeans" and replace with --k-means--.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*